United States Patent
Hashiguchi (10) Patent No.: US 9,607,398 B2
(45) Date of Patent: Mar. 28, 2017

(54) IMAGE PROCESSING APPARATUS AND METHOD OF CONTROLLING THE SAME

(71) Applicant: CANON KABUSHIKI KAISHA, Tokyo (JP)

(72) Inventor: Noriyasu Hashiguchi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/862,273

(22) Filed: Sep. 23, 2015

(65) Prior Publication Data

US 2016/0098843 A1   Apr. 7, 2016

(30) Foreign Application Priority Data

Oct. 2, 2014   (JP) ................................. 2014-204213

(51) Int. Cl.
G06T 7/00   (2006.01)

(52) U.S. Cl.
CPC .......... *G06T 7/0093* (2013.01); *G06T 7/0081* (2013.01); *G06T 2207/10024* (2013.01); *G06T 2207/20141* (2013.01)

(58) Field of Classification Search
CPC ......... G06T 2207/10024; G06T 7/0081; G06T 2207/20141; G06T 2207/30196; G06T 7/0093; G06F 17/30241; G06F 17/5031; G06F 17/505; G06F 17/5077; G06F 2217/06; G06F 2217/62; G06F 2217/84; G06F 3/011
See application file for complete search history.

(56) References Cited

U.S. PATENT DOCUMENTS

| | | | | |
|---|---|---|---|---|
| 5,877,774 A * | 3/1999 | Saito | ....................... | G06T 11/00 345/440 |
| 6,055,335 A * | 4/2000 | Ida | ......................... | G06T 9/001 382/232 |
| 6,728,400 B1 * | 4/2004 | Matsugu | ............... | G06T 7/0081 382/164 |
| 2008/0050012 A1* | 2/2008 | Oyama | ................ | G06K 9/0063 382/154 |
| 2009/0268026 A1* | 10/2009 | Mori | .................. | G06K 9/00798 348/148 |
| 2009/0315882 A1* | 12/2009 | Morgana | .............. | H04N 1/6058 345/419 |
| 2010/0259650 A1* | 10/2010 | Sasaki | .................. | G06K 9/6212 348/241 |

(Continued)

OTHER PUBLICATIONS

Achanta et al., "SLIC Superpixels", Ecole Polytechnique Fedrale de Lausanne (EPFL) Technical Report, 2010, pp. 1-15.

(Continued)

*Primary Examiner* — Jingge Wu
(74) *Attorney, Agent, or Firm* — Carter, DeLuca, Farrell & Schmidt, LLP (57) ABSTRACT

To improve a total throughput of graph generation processing. For doing so an inputted image is divided into a plurality of areas by clustering, based on a plurality of representative points, a plurality of pixels in the image. A set of representative points that are close is generated based on positions of the representative points. A plurality of the areas corresponding to the plurality of representative points included in the set based on respective feature amounts is unified.

10 Claims, 9 Drawing Sheets

(56) References Cited

U.S. PATENT DOCUMENTS

| | | | |
|---|---|---|---|
| 2011/0019890 A1* | 1/2011 | Oikawa | A61B 6/466 382/131 |
| 2011/0081634 A1* | 4/2011 | Kurata | G01C 21/20 434/236 |
| 2011/0299786 A1* | 12/2011 | Kazama | G06K 9/4652 382/225 |
| 2013/0054602 A1* | 2/2013 | Kami | G06F 17/30241 707/737 |
| 2013/0237827 A1* | 9/2013 | Yamamori | A61B 8/5207 600/450 |
| 2013/0266219 A1* | 10/2013 | Kurita | G06T 5/002 382/167 |
| 2016/0055643 A1* | 2/2016 | Ariizumi | G06T 7/0081 382/180 |

OTHER PUBLICATIONS

Ren et al., "gSLIC: a real-time implementation of SLIC superpixel segmentation", University of Oxford, Department of Engineering, Technical Report, 2011, pp. 1-6.

Iwane et al., "Landscape recognition of in-vehicle camera views based on graph-based segmentation", 27th Fuzzy System Symposium, 2011, pp. 775-778.

\* cited by examiner

INITIAL POSITIONS OF REPRESENTATIVE POINTS

FIG. 3B

FOUR NEIGHBORHOOD EDGES (ADJACENCY GRAPH)

FIG. 3C

EIGHT NEIGHBORHOOD EDGES (ADJACENCY GRAPH)

FIG. 3D

EDGES CONNECTING REPRESENTATIVE POINTS 2POINT AWAY IN HORIZONTAL DIRECTION (NEIGHBORHOOD GRAPH)

FIG. 4A

STAGGERED ARRANGEMENT AND FOUR DIRECTION EDGES

FIG. 4B

STAGGERED ARRANGEMENT AND SIX DIRECTION EDGES

AFTER DIVISION OF AREAS

FIG. 6A

REPRESENTATIVE POINT INITIAL POSITIONS AND EDGES

FIG. 6C

DETERMINATION OF ADJACENCY RELATIONSHIP

FIG. 6D

EXAMPLE OF LABEL REFERENCE POSITIONS FOR DETERMINATION

FOR RETICULAR ARRANGEMENT
8 DIRECTION GRAPH

FOR STAGGERED ARRANGEMENT
6 DIRECTION GRAPH

FOR STAGGERED ARRANGEMENT
4 DIRECTION GRAPH

REPRESENTATIVE POINTS
AFTER AREA DIVISION

FIG. 9B

REPRESENTATIVE POINTS
ADJACENCY GRAPH

FIG. 10A
PRIOR ART

LABEL MAP

FIG. 10B
PRIOR ART

ADJACENCY GRAPH

FIG. 10C
PRIOR ART

ADJACENCY LIST

| seed1 | seed2 |
|---|---|
| 0 | 1 |
| 0 | 3 |
| 1 | 3 |
| 3 | 4 |
| 3 | 6 |
| 1 | 2 |
| 1 | 4 |
| 1 | 5 |
| 1 | 8 |
| 2 | 5 |
| 5 | 8 |
| 4 | 6 |
| 4 | 8 |
| 6 | 7 |
| 6 | 8 |
| 7 | 8 |

FIG. 10D
PRIOR ART

LABEL MAP AFTER UNIFYING

IMAGE PROCESSING APPARATUS AND METHOD OF CONTROLLING THE SAME

BACKGROUND OF THE INVENTION

Field of the Invention

The present invention relates to an image processing technique for processing an inputted image.

Description of the Related Art

A segmentation method is used as a technique for dividing an image into a plurality of areas for which an attribute such as a color, a pattern, a brightness, or the like, is the same. For the divided areas, it is possible to reduce a processing amount compared to a case of processing an image at a pixel level because it is possible to perform an area recognition, or encoding processing in units of areas thereafter. In recent years, cases in which image processing is performed on an image of a high resolution in an embedded device are increasing, and it can be considered that complicated real-time processing on an image of a high resolution will become possible even in an embedded device by processing images in units of areas after a segmentation.

Several methods for realizing real-time segmentation processing have been proposed. A technique amongst these for dividing an image into areas by clustering pixel data using 5-dimensional information (color space (R, G, B) and coordinate space (X, Y)) is known. R. Achanta, A. Shaji, K. Smith, A. Lucchi, P. Fua, and S. Süsstrunk, "SLIC Superpixels," tech. rep., EPFL, EPFL, 2010 is a document that discloses this technique (hereinafter referred to as document 1). The method disclosed in document 1 is referred to as Simple Linear Iterative Clustering (SLIC). First of all, representative points which are the centers of each cluster is arranged in a reticular pattern in an image. The representative points in the SLIC method comprise 5-dimensional information (a color space (R, G, B) and a coordinate space (X, Y)). The representative points are referred to as seeds, cluster centroids, or the like. Clustering in the SLIC method is based on a k-means method, and each pixel configuring the image is clustered at a representative point arranged in the reticular pattern. A characteristic of the SLIC method is a point that a coordinate space clustered at a representative point is limited to a predetermined area. A collection of pixels clustered at a representative point is a segmented area. Segmented areas are referred to as Superpixels. This method has a characteristic in that it is possible to process with a small calculation amount in proportion to the image size for something where there is repetitive processing.

Also, a technique for realizing an optimization of the method of document 1 by implementing it on a GPU (Graphics Processing Unit) is known. C. Y. Ren and I. Reid. gSLIC: a real-time implementation of SLIC superpixel segmentation. University of Oxford, Department of Engineering, Technical Report, 2011 (hereinafter referred to as document 2) is a document that discloses such a technique. In document 2, a hierarchical clustering scheme is used to implement high speed processing on a GPU. With this, real-time segmentation processing of a high-resolution image is realized.

Meanwhile, there is a technique that is a method for performing a segmentation based on a Superpixel unification (an area unification). Iwane, Yoshida, "landscape recognition of in-vehicle camera using segmentation based on superpixel unification", Japanese Fuzzy System Symposium, 2011, Iwane, Yoshida, "Landscape recognition of in-vehicle camera views based on graph-based segmentation", 27th Fuzzy System Symposium, 2011 (hereinafter referred to as document 3) is a document that discloses such a technique. In document 3, Superpixels are generated based on graphs. Then, using a discriminator generated by Adaboost on the Superpixels, unification is performed by adding area labels to the Superpixels. This unification processing unifies a plurality of Superpixels replacing them with 1 new Superpixel. For example, an image captured by an in-vehicle camera can be divided into 3 areas by a discriminator: sky, ground, and a vertical object. This is referred to as a semantic segmentation, and is processing in which each area has a meaning.

In the graph-based processing of document 3, the generation of Superpixels is performed, and then at a subsequent stage, using the graph, Superpixel unification is performed. Meanwhile, in order to perform a graph-based unification of Superpixels generated by a clustering scheme illustrated in document 1, it is necessary to generate a graph that represents an adjacency relationship of the Superpixels prior to the unification processing.

Figure 10A:
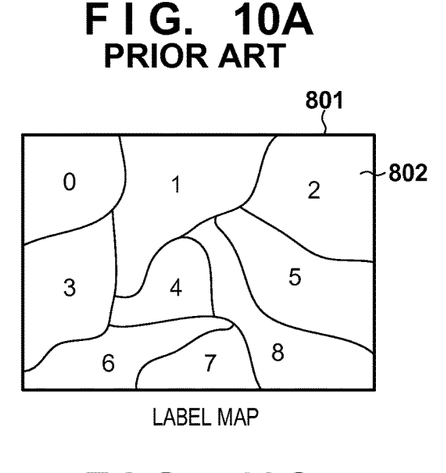
FIGS. 10A-10D are views for explaining a label map representing Superpixels and an adjacency graph of Superpixels.

Explanation is given for this graph generation processing using FIGS. 10A-10D. FIG. 10A illustrates a label map 801 for Superpixels generated by a clustering scheme. The label map 801 manages label values corresponding to each pixel of the input image, and the label values are indexes of the Superpixels generated by clustering. For example, the index "2" is added for a Superpixel 802 by the clustering, and "2" is added as a label value in an area of the Superpixel 802 on the label map 801. FIG. 10A illustrates that there are 9 Superpixels, and the label values 0-9 are assigned.

Figure 10B:
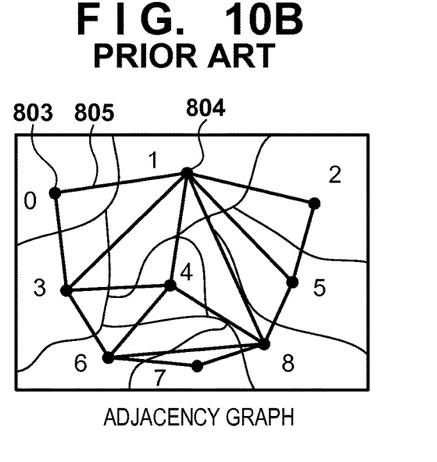
Figure 10C:
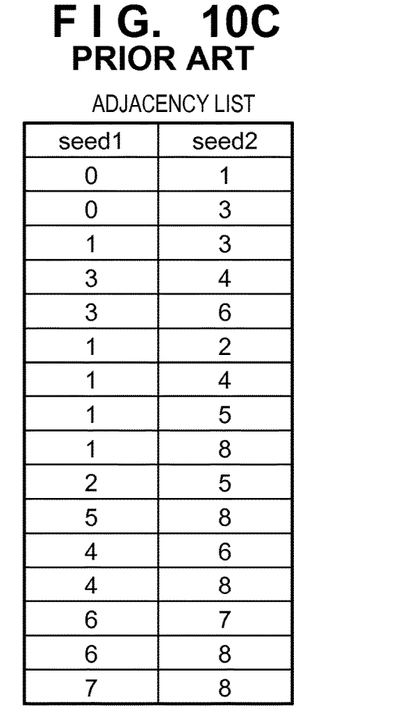

In the graph generation processing, the label map 801 is read, the adjacency relationship of the Superpixels is investigated, and an adjacency graph such as in FIG. 10B is generated. The areas adjacent to the area for which the label value is "0" are the areas for which the label value is "1" and "3". In order to obtain the adjacency relationship from the label map 801, boundary portions of the label values are detected, and an adjacency list is generated by making a set of label values of boundary portions into a list. The set of label values may be "0" and "1", and "0" and "3", for example. Because multiple sets of label values are obtained, the adjacency list is generated having excluded overlapping label value sets. An adjacency list such as is illustrated in FIG. 10C is generated for the adjacency graph of FIG. 10B. By the above process, a representative point 803 and a representative point 804, and information of an edge 805 that connects these can be obtained.

Figure 10D:
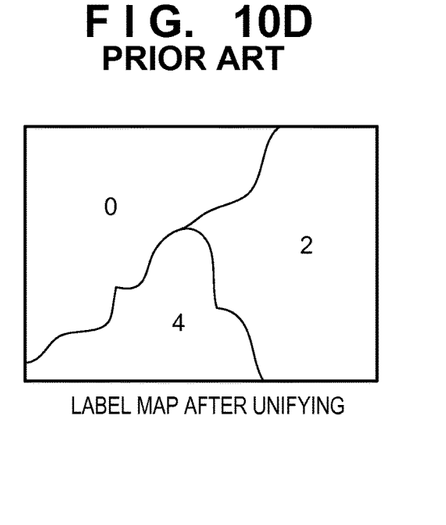

Next, explanation is given for a simple example of Superpixel unification. Feature amounts of the Superpixels on both sides of an edge are investigated based on the adjacency list of FIG. 10C, and if they are similar, processing for unifying them is performed. For a feature amount, information such as a color average or a histogram of pixels belonging to a Superpixel is used. Also, for a similarity, determination can be made by a difference in color averages, or a histogram intersection value. FIG. 10D is a label map after the Superpixels are unified. As is illustrated in the same figure, the Superpixels having label values of "0", "1" and "3" are unified into the Superpixel having the label value of "0". Also, the Superpixels having label values of "2", "5" and "8" are unified into the Superpixel having the label value of "2". Also, the Superpixels having label values of "4", "6" and "7" are unified into the Superpixel having the label value of "4".

In the graph generation processing, in order to investigate the adjacency relationship of the areas, the label map is read in a raster scan, or the like, and boundaries between areas are detected. Then, processing for extracting the label value sets from the boundaries between the detected areas, and generating an adjacency list without overlapping is necessary. Because this processing performs a label map readout, and searches whether or not a label value set that is detected sequentially already exists in the adjacency list, it is necessary to perform random access on the memory in which the adjacency list is stored, and therefore optimization is difficult.

SUMMARY OF THE INVENTION

The present invention was conceived in view of the above described issues. The present invention provides a technique for improving a total throughput of segmentation processing.

The present invention in its aspect provides an image processing apparatus comprising: a dividing unit configured to divide an inputted image into a plurality of areas by clustering, based on a plurality of representative points, a plurality of pixels in the image; a generating unit configured to generate a set of representative points that are close based on positions of the representative points; and a unifying unit configured to unify a plurality of the areas corresponding to the plurality of representative points included in the set based on respective feature amounts.

By virtue of the present invention it is possible to improve a total throughput.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will now be described hereinafter in detail, using the drawings.

First Embodiment

Explanation is given for an example for performing semantic segmentation using an image processing apparatus functioning as a segmentation apparatus in the present embodiment.

Figure 1:
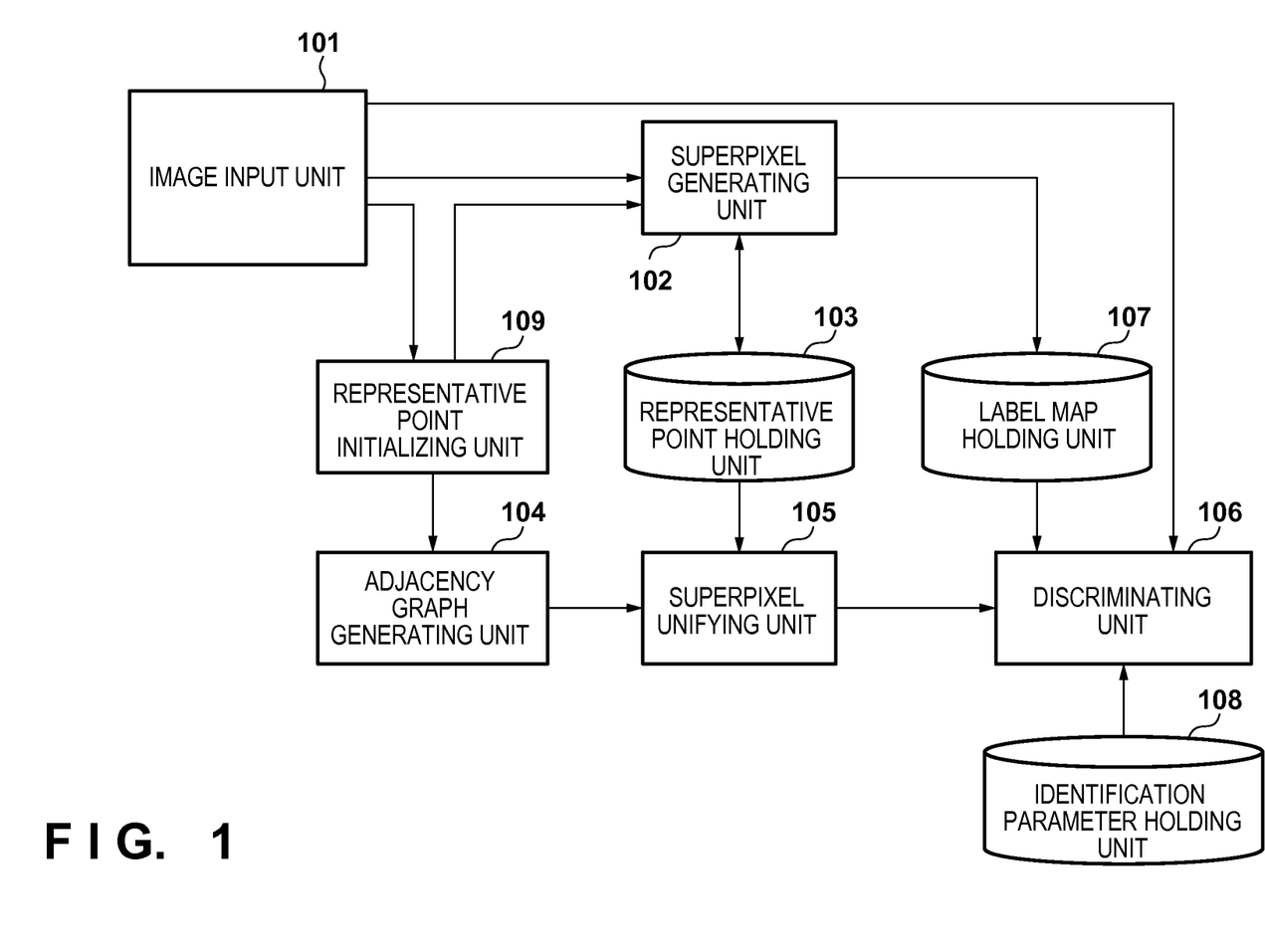
FIG. 1 is a configuration diagram of an image processing apparatus of a first embodiment.

FIG. 1 is a block configuration diagram of an image processing apparatus of a first embodiment.

An image input unit 101 is comprised of elements such as a driver circuit controlling an optical system device, a photoelectric conversion device, and a sensor, an AD converter, a signal processing circuit responsible for various image corrections, and a frame buffer. Functions of the image input unit 101 are to turn input light into an image, and to output image data. The image data handled in the present embodiment is an RGB color image into which a visible light beam is converted. A gray image representing luminance, or an image taking an invisible light beam such as an ultraviolet band, an infrared band, or the like, can be used as well. The type and format of the input image are not limited to this.

A Superpixel generating unit 102 generates Superpixels using an image inputted by the image input unit 101 and a representative point generated by a representative point initializing unit 109. A Superpixel is generated in accordance with an SLIC method disclosed in document 1, for example.

Figure 2:
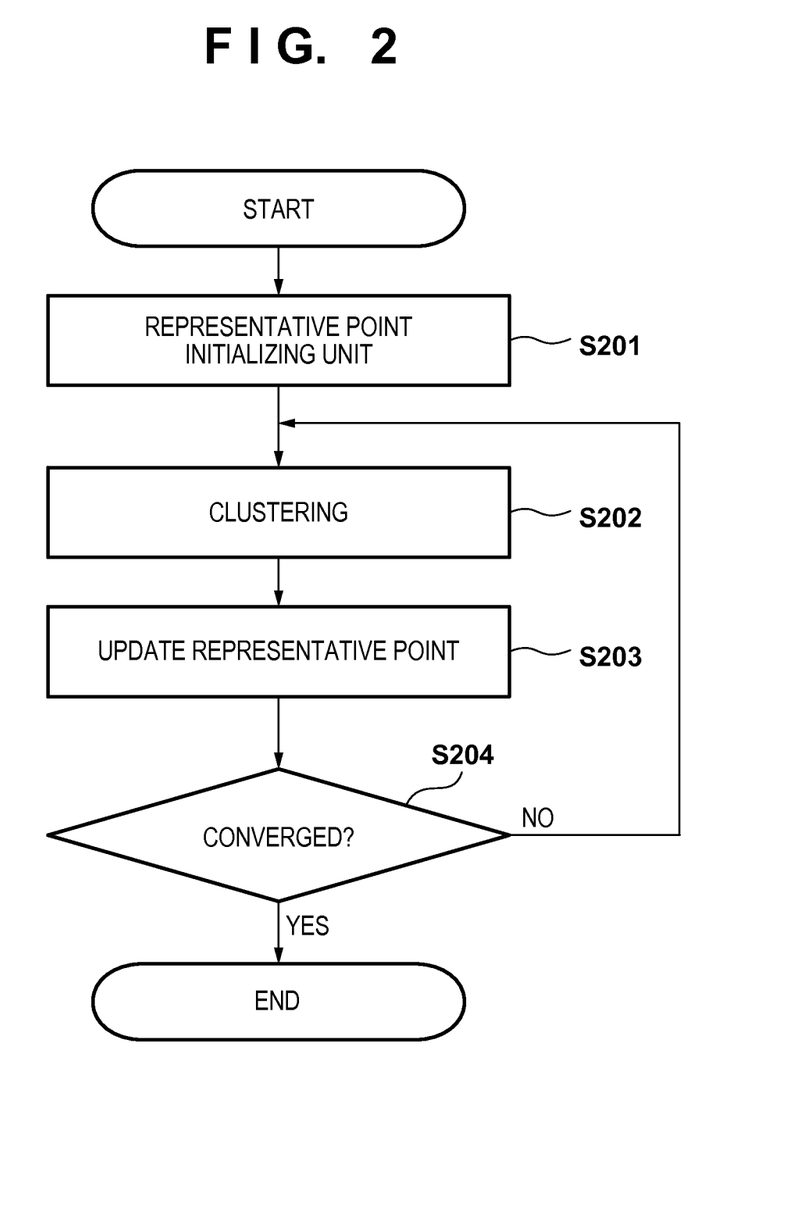
FIG. 2 is a flowchart for illustrating Superpixel generation processing in the first embodiment.

Here, explanation is given for Superpixel generation processing by the SLIC method using the flowchart of FIG. 2. The processing in FIG. 2 is executed by the Superpixel generating unit 102 and the representative point initializing unit 109 in a cooperative manner. Note that, the processing in FIG. 2 can be realized by a CPU of a computer reading out and executing a program stored on a ROM.

Figure 3A:
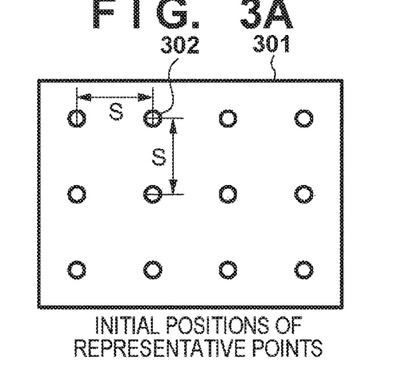
FIGS. 3A-3D are explanatory views of an initial arrangement of representative points and adjacency/neighborhood graphs in the first embodiment.

Firstly, the representative point initializing unit 109 performs initialization of representative points in step S201. Here, a representative point comprises 5-dimensional information of a color space (R, G, B) and a coordinate space (X, Y). The representative point initializing unit 109 initializes the coordinate space (X, Y) by arranging a representative point 302 in a reticular pattern with a horizontal and vertical interval S on an image 301, as shown in FIG. 3A in step S201. Then, the representative point initializing unit 109 initializes the color space (R, G, B) with pixel values of the image 301 corresponding to the arranged coordinates. The pixel values of the image 301 are obtained with reference to the image inputted by the image input unit 101. Then, the representative point 302 initialized by the representative point initializing unit 109 is supplied to the Superpixel generating unit 102. In FIG. 3A, twelve representative points including the representative point 302 are generated.

Next, the Superpixel generating unit 102 performs clustering processing of pixels configuring the inputted image in step S202. In the clustering processing, the Superpixel generating unit 102 calculates a distance Ds to a pixel within an area of a predetermined range with the representative point at its center. For example, a CIELAB color space is used in document 1, but here, explanation is given using an RGB color space. The color space (R, G, B) of a k-th representative point is $(r_k, g_k, b_k)$ and the coordinate space (X, Y) is $(x_k, y_k)$. When the number of the representative points arranged by the interval S is K, k takes one value in the range from 0 to K−1. The color space (R, G, B) of i-th pixel is $(r_i, g_i, b_i)$ and the coordinate space (X, Y) is $(x_i, y_i)$. i is an index representing a pixel position in the image 301. A calculation equation of the distance Ds is shown in the following equation.

$$D_{rgb} = \sqrt{(r_k - r_i)^2 + (g_k - g_i)^2 + (b_k - b_i)^2} \quad (1)$$
$$d_{xy} = \sqrt{(x_k - x_i)^2 + (y_k - y_i)^2}$$
$$D_s = d_{rgb} + \frac{m}{s} d_{xy}$$

Wherein m in Equation 1 is a coefficient. Also, the value calculated by the coefficient m divided by the interval S is assumed to be a parameter of a weight multiplied by a Euclidean distance of the coordinate space added to the color space. In Equation 1, at the representative points having the 1st to K-th indexes, a distance calculation for the corresponding pixel is performed, and the representative point having the closest distance is selected for each pixel. The index of the selected representative point is made to be a label value, and a label map is outputted. The Superpixel generating unit 102 stores the outputted label map in a label map holding unit 107.

Next, the Superpixel generating unit 102 performs updating of representative points in step S203. In the representative point updating, the Superpixel generating unit 102 calculates a color average and barycentric coordinates from pixels of a Superpixel to which a respective representative point belongs. The Superpixel generating unit 102 stores the updated representative points in a representative point holding unit 103. As an updated representative point, the color average of the pixels which belong to the respective Superpixel is stored in the color space (R, G, B), and barycentric coordinates of the collection of pixels belonging to the respective Superpixel are stored in the coordinate space (X, Y).

Next, the Superpixel generating unit 102 determines whether or not clustering converged in step S204. In this determination it is determined whether or not the Euclidean distance between the representative points prior to the updating and the representative points after updating are less than or equal to a predetermined threshold. Here, the Euclidean distance between the representative points is calculated using the information of the coordinate space. In addition, in the distance calculation of the convergence determination in the present embodiment, it may be that only a Euclidean distance of the color space is calculated, or it may be that a Euclidean distance combining the coordinate space and the color space is calculated. In addition, the distance calculation is not limited to the Euclidean distance and calculation may be performed using Manhattan distance. In addition, convergence determination is not limited to the use of distance; the convergence determination may be by a method where a repetition count is set to a fixed number of times such as three times or ten times. Such an implementation is possible in a case where it is possible to determine that sufficient convergence is anticipated for a repetition of the fixed number of times.

In a case where the determination result indicates that the clustering has not converged ("NO" in step S204), the processing returns to step S202 and clustering processing is repeated. Upon this repetition, information stored in the representative point holding unit 103 is used for the representative points used in step S202. Meanwhile, in a case where the determination result indicates that the clustering has converged ("YES" in step S204), the Superpixel generation is terminated.

Next, explanation will be given for an adjacency graph generating unit 104. The adjacency graph generating unit 104 generates an adjacency graph used by a Superpixel unifying unit 105. The adjacency graph generated here is generated based on the initial arrangement of the representative points of the Superpixel generating unit 102. The information of the initial arrangement of the representative points is obtained from the representative point initializing unit 109. In the present embodiment, the initial arrangement of the representative points is in a reticular pattern as shown in FIG. 3A, and the number of the representative points is determined by the interval S. The information of the initial arrangement of the representative points is the number of the representative points arranged in a horizontal direction and the number of the representative points arranged in a vertical direction.

Figure 3B:
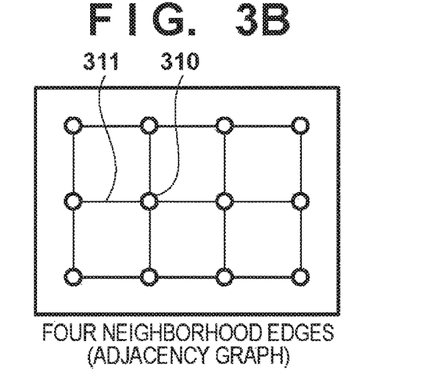
Figure 3C:
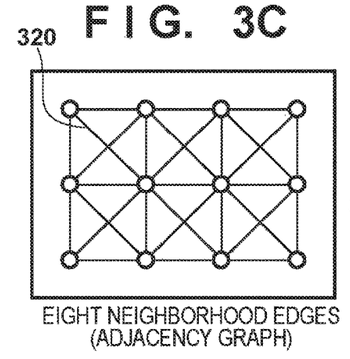
Figure 3D:
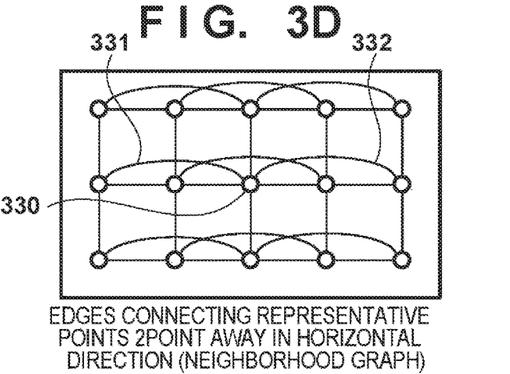

The adjacency graph generating unit 104 generates an edge 311 for four neighborhood representative points of a representative point 310, from the information of the initial arrangement of the representative points, shown in FIG. 3B. In FIG. 3B, a case where 17 edges are generated from 12 representative points is shown. These edges are expressed as an adjacency list as shown in FIG. 10C. In the present embodiment, explanation is given using the adjacency graph shown in FIG. 3B; also adjacency graphs shown in FIG. 3C or FIG. 3D may be generated. FIG. 3C is an adjacency graph where diagonal direction edges such as an edge 320 are added and a representative point of interest is connected to 8 neighborhood representative points. Also, not only the representative points adjacent to the representative point of interest, but also other close representative points may be connected. FIG. 3D is a graph connecting not only adjacent representative points but also the representative points 2 points away in a horizontal direction to the representative point of interest. The adjacency graph of FIG. 3D is referred to as a neighborhood graph, and in a case where a neighborhood graph is generated, the adjacency graph generating unit 104 functions as a neighborhood graph generating unit. For example, an edge 331 and an edge 332 are edges connected to representative points that are 2 points away from a representative point 330.

Because a graph can be generated from the initial arrangement of the representative points in the adjacency graph generating unit 104, it is possible to omit processing for generating edges by investigating the adjacency relationships. The adjacency graph generating unit 104 transmits generated edge information to the Superpixel unifying unit 105.

The Superpixel unifying unit 105 receives the edge information from the adjacency graph generating unit 104. Then, the Superpixel unifying unit 105 performs unification processing using the received edge information and the representative point information stored in the representative point holding unit 103 by the Superpixel generating unit 102. In the unification processing, a similarity of Superpixels belonging to either side of received edges is calculated. Then, Superpixels which have a high similarity are unified and Superpixels which have a low similarity are not unified. In a case of unifying, the Superpixels prior to the unification are replaced by an unified new Superpixel. A simple example of a similarity calculation is a calculation using color averages of Superpixels included in the representative point information. Color averages of pixels which belong to the Superpixels on either side of an edge are obtained, the Euclidean distance of two color averages is calculated, and the result is treated as the similarity. Then, in a case where this Euclidean distance is less than or equal to a threshold, it is determined to be a high similarity, and in a case where the Euclidean distance exceeds the threshold, it is determined to be a low similarity. In the present embodiment, explanation is given using the Euclidean distance of the color average for similarity but another similarity may be used. For example, configuration may be taken so that a histogram is generated by the color of pixels included in the Superpixels, a histogram intersection is calculated, and the result is treated as the similarity. The definition of similarity is not limited to these.

The Superpixel unifying unit 105 performs the above unification processing for all of the edges. The Superpixel unifying unit 105 generates a label conversion table for converting, for information obtained by the unification processing, label values managed by a label map held in the label map holding unit 107 into new label values for after the unification. Then, the Superpixel unifying unit 105 transmits the generated label conversion table to a discriminating unit 106.

The discriminating unit 106 extracts a feature amount by area in a pre-processing of discrimination. The feature amount by area is a feature amount obtained for each Superpixel, and is a typical feature amount such as an area, a moment, a histogram, or the like. The discriminating unit 106 calculates the feature amount using the input image from the image input unit 101, the label map held by the label map holding unit 107, and the label conversion table of the Superpixel unifying unit 105. Label values managed by the label map held by the label map holding unit 107 are the label values prior to the unification, and so these are converted into the label values for after the unification by using the label conversion table. Then, the discriminating unit 106 calculates the feature amount by area for each Superpixel based on the input image and the corresponding label values.

Next, the discriminating unit 106 determine categories based on the feature amount by area. The categories have meanings such as sky, nature, or the like, for example, and are determined by calculating a likelihood based on how close each Superpixel is to a category. The determination method may be a rule based method of determining the category by combining a plurality of rules such as setting sky if the blue in the color of the Superpixel exceeds a threshold. Also, categories may be distinguished for a feature amount by area of a processing target by a method such as Support Vector Machine (SVM) which is based on machine learning. In a case of a rule-based method, a threshold, and other parameters are held in an identification parameter holding unit 108, and a category is determined for a feature amount by area by reading from the identification parameter holding unit 108 by the discriminating unit 106 as appropriate. Also, in the case of a machine learning based method, a plurality of parameters obtained by machine learning are held in the identification parameter holding unit 108, and a category for a feature amount by area is determined by reading from the identification parameter holding unit 108 by the discriminating unit 106 as appropriate. Note that the feature amount by area and the determination method are not limited to the above.

In the present embodiment, the information of the representative points initialized by the representative point initializing unit 109 is passed to the adjacency graph generating unit 104, but cases in which the image size and the interval S at which the representative points are arranged are fixed can be considered. In such a case, configuration may be taken such that the edge information from the adjacency graph generating unit 104 is generated without input of the representative point initializing unit 109 because there is no need to pass information of initialized representative points to the adjacency graph generating unit 104 from the representative point initializing unit 109.

Figure 4A:
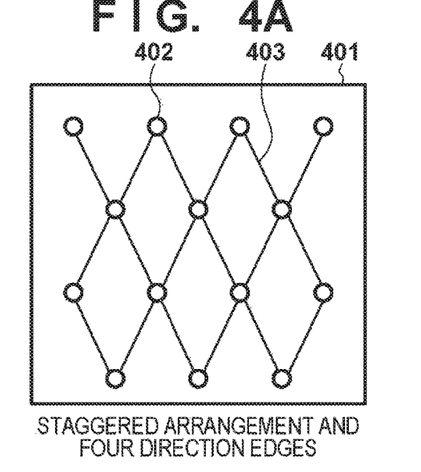
FIGS. 4A and 4B are explanatory views of a staggered arrangement graph.
Figure 4B:
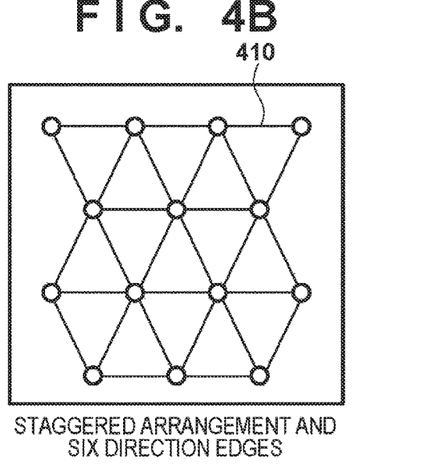

Also, in the present embodiment, an example in which the initial arrangement of the representative points is arranged in the reticular pattern as shown in FIG. 3A is given, but limitation is not made to this. For example, an adjacency graph may be defined by edges in 4 directions configured by an edge 403 that is diagonal from a representative point of interest, where a representative point 402 is arranged in an image 401 to be staggered, as is illustrated in FIG. 4A. Also, as is illustrated in FIG. 4B, an adjacency graph may be defined by edges in 6 directions in relation to a representative point by further adding an edge 410 in a horizontal direction. In this way, one of the features of the present embodiment is to define an adjacency graph based on an initial arrangement of the representative points, and to use processing such as a Superpixel unification using an adjacency graph or a neighborhood graph representing an adjacency relationship or a neighborhood relationship of the Superpixels. Here, limitation is not made to the adjacency graph or the neighborhood graph explained in the present embodiment, and any adjacency graph or neighborhood graph may be used if it is possible to achieve the same effect.

As explained above, by virtue of the present embodiment, it is possible to omit/simplify processing related to generation of an adjacency graph without executing processing for generating an non-overlapping adjacency list of edges representing an adjacency relationship of Superpixels by reading a label map in order to generate the adjacency graph. With this, it is possible to improve a total throughput.

For the representative points in the methods illustrated in documents 1 and 2, a range of transition from the initial arrangement is narrow. For this reason, even if a graph is generated based on the layout of the representative points as in the present embodiment, the adjacency/neighborhood relationships can be maintained in most cases.

Second Embodiment

In the first embodiment, explanation was given for a method of defining and using an adjacency graph or a neighborhood graph based on the initial arrangement of representative points for an adjacency relationship or a neighborhood relationship of Superpixels. In contrast to this, in the second embodiment, explanation will be given a configuration in which it is determined and used whether or not an adjacency relationship indicated in an adjacency graph is correct by using a label map. In other words, in the second embodiment, it is determined whether or not edges configuring a graph generated as an adjacency graph represent an adjacency relationship.

Figure 5:
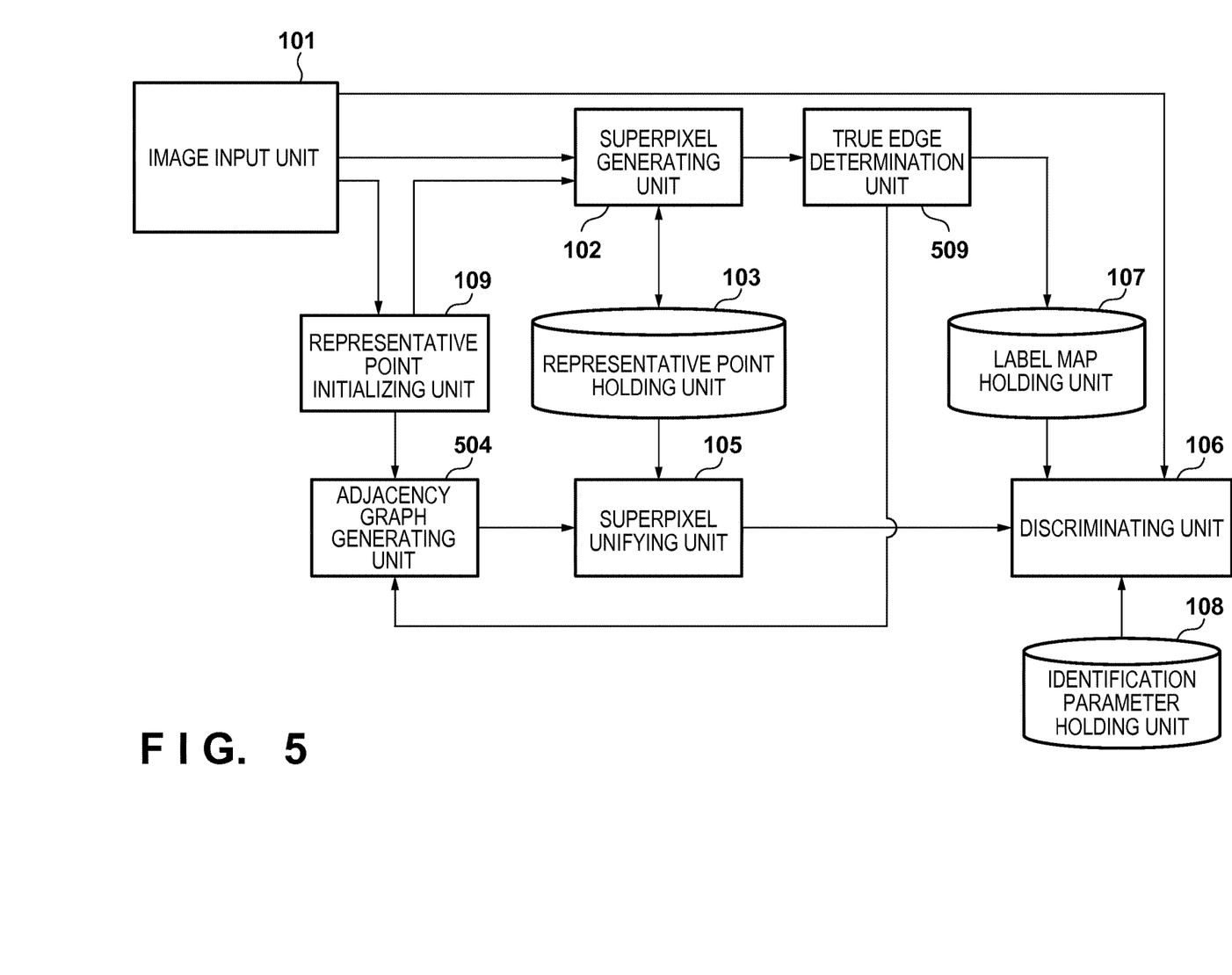
FIG. 5 is a configuration diagram of an image processing apparatus of a second embodiment.

FIG. 5 is a configuration diagram of an image processing apparatus of a second embodiment. A difference to the image processing apparatus of FIG. 1 of the first embodiment is in the point that a True edge determination unit 509 is added, and in the point that an adjacency graph generating unit 504 that executes processing having received an output of the True edge determination unit 509 exists. Note that in FIG. 5 the same reference numerals are added for the same elements as in FIG. 1 of the first embodiment, and detailed explanation thereof is omitted.

The Superpixel generating unit 102 generates Superpixels in accordance with the input image from the image input unit 101. A label map that the Superpixel generating unit 102 outputs is transmitted to the True edge determination unit 509.

Figure 6A:
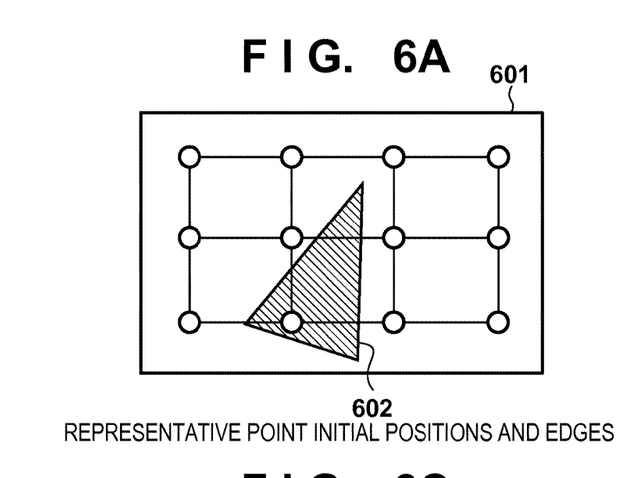
FIGS. 6A-6D are views for explaining a True edge and a method of detecting the True edge in the second embodiment.
Figure 6B:
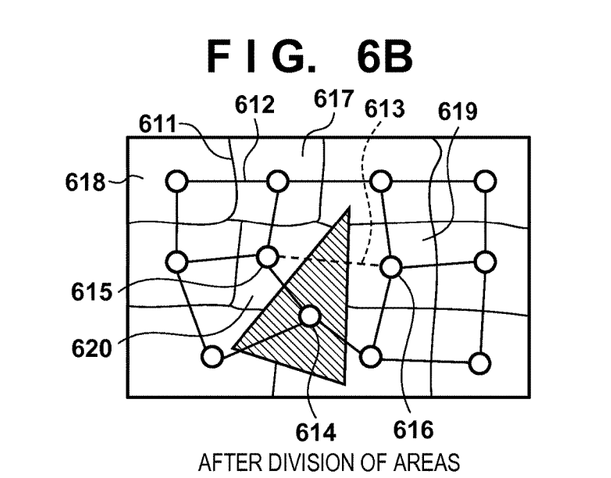

Firstly, explanation will be given for a True edge that is detected by the True edge determination unit 509. There are cases where for an edge generated based on the initial arrangement of the representative points, an adjacency relationship is broken due to Superpixel generation. FIG. 6A is a graph in which representative points are arranged in a reticular pattern, and edges of representative points in 4 directions are connected for segmentation of an input image 601 in which a triangular object 602 exists. FIG. 6B is a pattern diagram for after a segmentation processed by the Superpixel generating unit 102. Reference numeral 611 denotes a boundary of Superpixels. An edge 612 represents a correct adjacency relationship after a segmentation, and so this is defined hereinafter as a True edge. Meanwhile, an edge 613 represents an edge connecting a Superpixel of a representative point 615 and a Superpixel of a representative point 616, but the edge 613 is divided by a Superpixel of a representative point 614. Hereinafter this will be defined as a False edge. The True edge determination unit 509 performs processing for determining each edge after segmentation from edges generated based on the initial arrangement of the representative points, and detecting True edges.

Figure 6C:
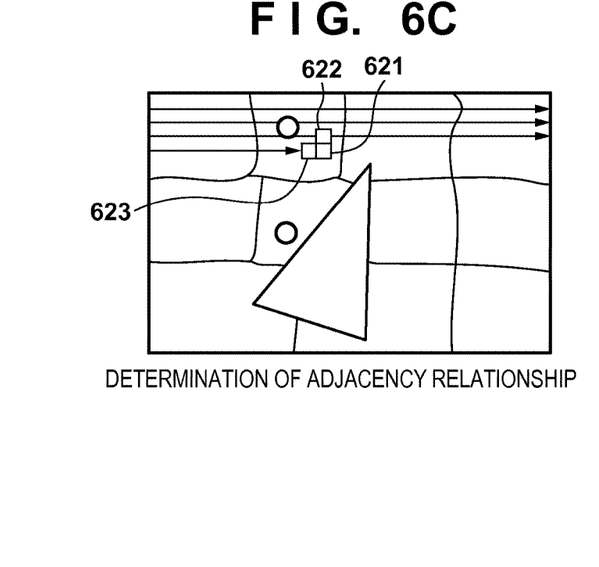

In order to determine True edge in edges in 4 directions that are handled in the present embodiment, the label map is raster scanned, and label values of positions 621, 622 and 623 of FIG. 6C are referenced. As an example of investigating an adjacency relationship in a horizontal direction of Superpixels explanation is given of processing for determining that the edge 612 is a True edge and that the edge 613 is a False edge. The label values of the position 621 and the position 623 are used in order to investigate whether Superpixels are adjacent in a horizontal direction. In a case where they are adjacent, as are the Superpixels 617 and 618 on either side of the edge 612, a condition that the label values of the positions 621 and 623 respectively match the label values of Superpixels 617 and 618 is satisfied one or more times in a raster scan. When this condition is satisfied one or more times, the edge 612 is determined to be a True edge. On the other hand, in a case where they are not adjacent, as is the case with the Superpixels 619 and 620 on either side of the edge 613, a condition that the label values of the positions 621 and 623 respectively match the label values of Superpixels 619 and 620 is not satisfied in a raster scan. When this condition is not satisfied, the edge 613 is determined to be a False edge. By the above processing it is possible to investigate the adjacency relationship in a horizontal direction.

Similarly, a label value of the position 621 and a label value of the position 622 are referenced, and it is determined whether or not these are label values that are adjacent in a vertical direction. Here, explanation is given separately for determination of an adjacency relationship in a horizontal direction and in a vertical direction, but these may be processed together in a single raster scan of a label map.

The label map used by the True edge determination unit 509 is transmitted to the label map holding unit 107. Also, True edge information determined by the True edge determination unit 509 is transmitted to the adjacency graph generating unit 504. In the adjacency graph generating unit 504, basically the same processing as the processing of the adjacency graph generating unit 104 of FIG. 1 of the first embodiment is performed. A portion that differs is in processing for selecting only True edges from the edges generated based on the information of the True edges that was transmitted, and transmitting those to the Superpixel unifying unit 105.

Next, the Superpixel unifying unit 105, similarly to in the first embodiment, performs unification processing by investigating a feature amount of the Superpixels on both sides of the edges that were sent. The edges sent to the Superpixel unifying unit 105 are only True edges. The processing after the discriminating unit 106 is as is explained in the first embodiment.

Figure 6D:
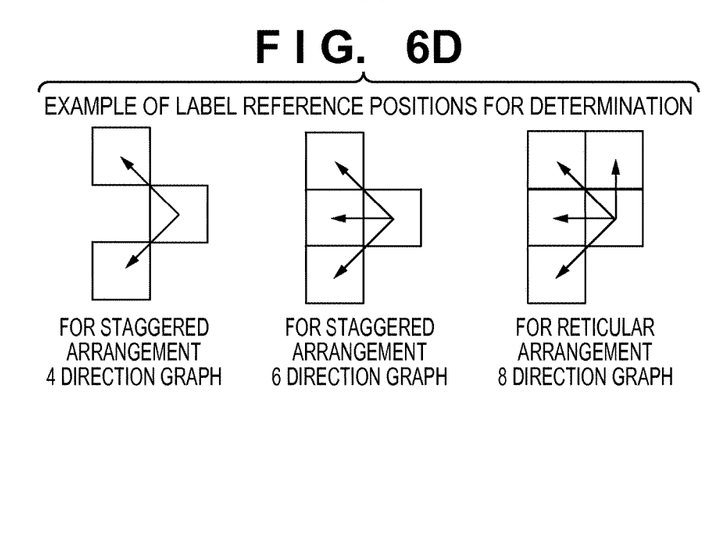

In the second embodiment above, True edges are detected by the True edge determination unit 509, and only True edges are selected by the adjacency graph generating unit 504, and unified by the Superpixel unifying unit 105. In the second embodiment, explanation was given for reference positions of label values in a graph in which a reticular arrangement is for 4 directions, but limitation is not made to this. For example, the adjacency relationship may be determined by label value reference positions indicated in FIG. 6D for the staggered arrangement 4 direction graph of FIG. 4A, the staggered arrangement 6 direction graph of FIG. 4B, or the reticular arrangement 8 direction graph of FIG. 3C.

Also, in the present embodiment, True edges are detected by the True edge determination unit 509, and information thereof is passed to the adjacency graph generating unit 504, but limitation is not made to this. For example, processing may be such that False edges are detected, such that information of the False edges is passed to the adjacency graph generating unit 504, and such that only True edge are selected.

As explained above, by virtue of the second embodiment, in addition to the effect explained in the first embodiment, it is possible to generate a higher precision adjacency graph by determining whether or not an adjacency relationship indicated by the adjacency graph is correct.

Third Embodiment

In the first and second embodiments, explanation was given for configurations that realize the segmentation processing for generating Superpixels by dedicated hardware, but limitation is not made to this. For example, there is the same effect of improving speed in software processing by a program that a CPU of an information processing apparatus realized by a personal computer, or the like, executes.

Figure 7:
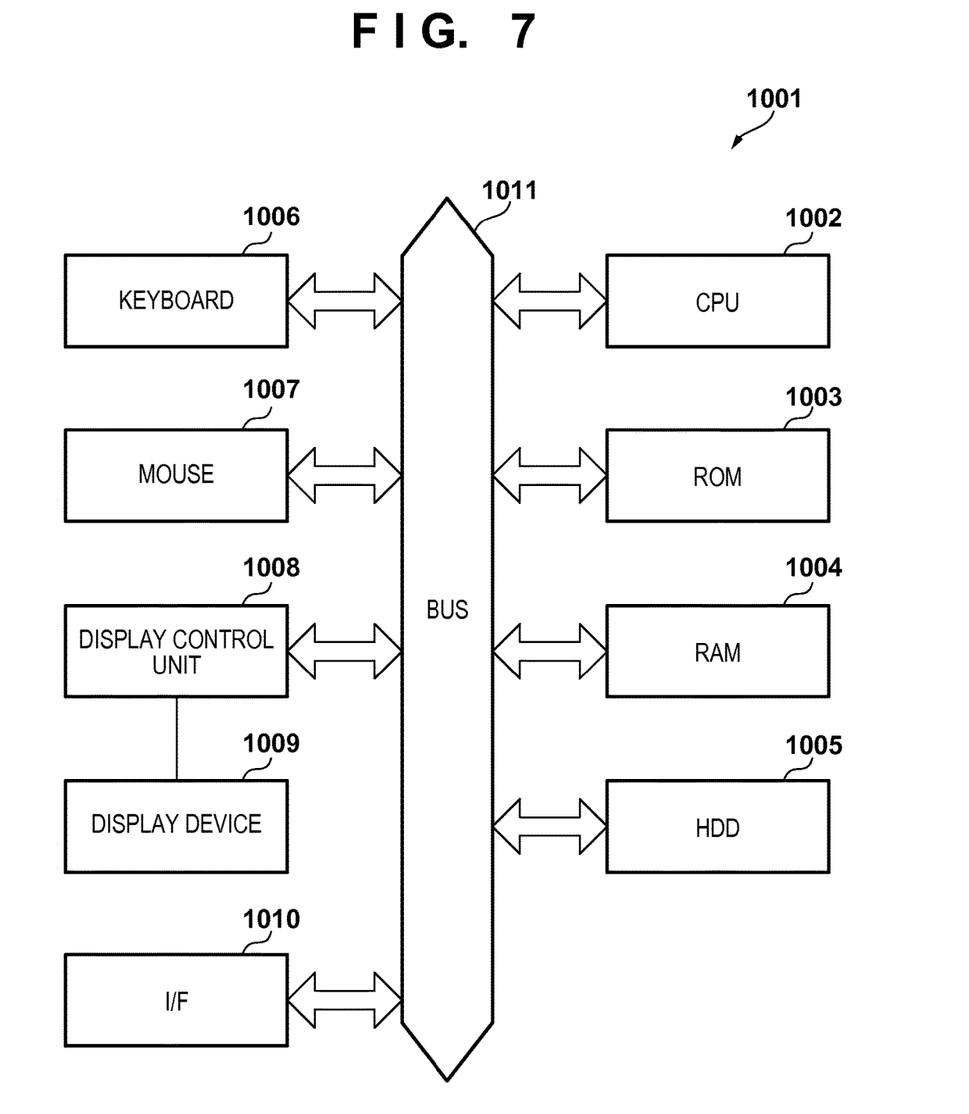
FIG. 7 is view for illustrating a hardware configuration of an image processing apparatus of a third embodiment.

FIG. 7 is a view for illustrating a hardware configuration of an information processing apparatus 1001 which is capable of realizing image processing functions in the first and second embodiments. Reference numeral 1002 denotes a CPU which manages control of the apparatus on the whole. Reference numeral 1003 denotes a ROM which stores various programs such as a boot program, or a BIOS. Reference numeral 1004 denotes a RAM which is used as a work area and a temporary saving area for the CPU 1002. Reference numeral 1005 denotes a hard disk drive (HDD) which stores an OS, an application for generating block segmentation information, and various data.

Reference numeral 1006 denotes a keyboard, and reference numeral 1007 denotes a mouse, and these function as user interfaces for performing various input into the information processing apparatus 1001. Reference numeral 1008 denotes a display control unit which has internal built in video memory and display controller, and which controls display of image or the like. Reference numeral 1009 denotes a display device which receives and displays image signals from the display control unit 1008. Reference numeral 1010 denotes an interface (I/F) which connects various external devices, and realizes communication between the information processing apparatus 1001 and an external device. The various elements configuring the information processing apparatus 1001 are connected to each other via a bus 1011, and transmit/receive data to each other thereon.

Figure 8A:
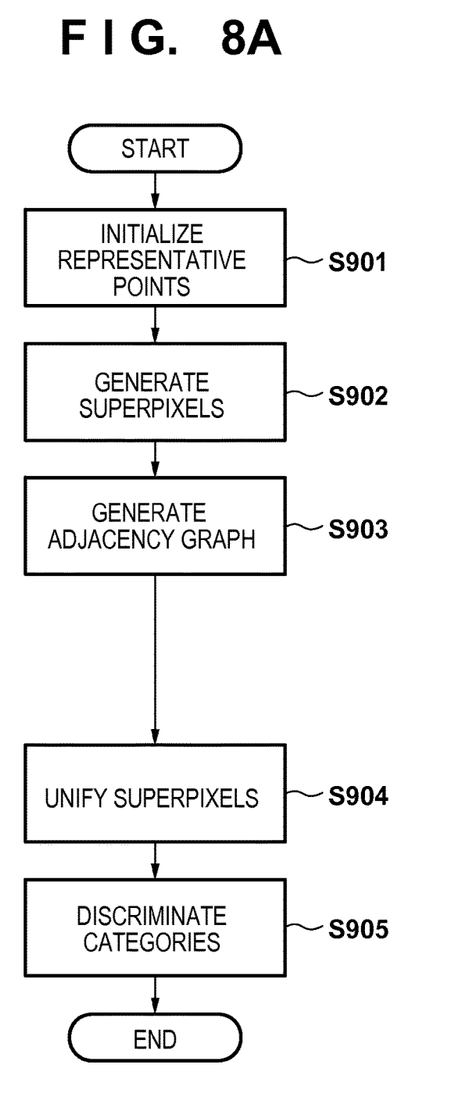
FIGS. 8A and 8B are flowcharts for illustrating segmentation processing in the third embodiment.
Figure 8B:
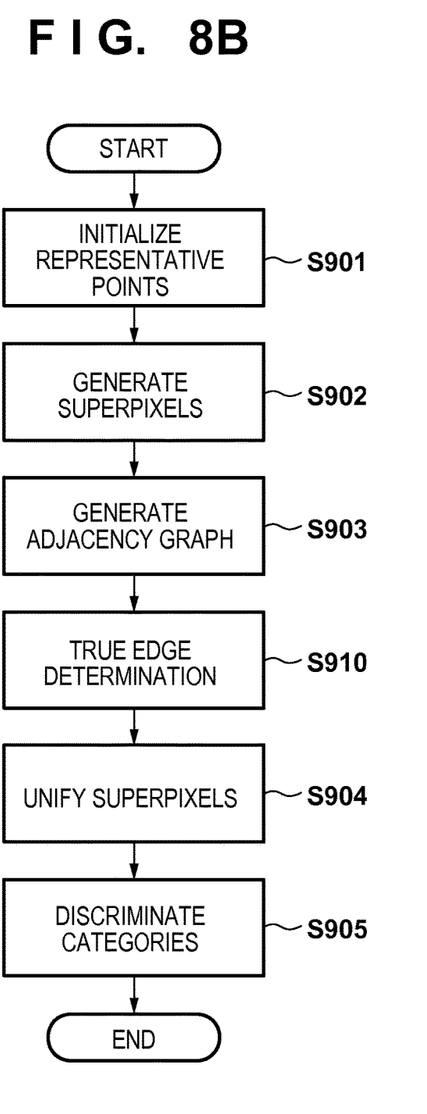

Next, explanation is given for processing realized by software operating on the information processing apparatus 1001 using the flowcharts of FIG. 8.

FIG. 8A is a flowchart for a case in which the processing of the first embodiment is executed by software. This processing is realized by the CPU 1002 reading a program stored in the HDD 1005 into the RAM 1004, and executing it. Note that image data of a processing target is already stored in the HDD 1005.

In step S901, the CPU 1002 reads the image data of the processing target, and initializes representative points. Regarding the initialization of the representative points, initialization of a color space and a coordinate space is performed as is illustrated in the first embodiment. Next, in step S902, the CPU 1002 generates Superpixels. As is illustrated in the first embodiment, processing for clustering pixels for representative points is performed in step S902.

Next, in step S903, the CPU 1002 generates an adjacency graph. Conventionally, the adjacency graph is generated by reading a label map obtained by the generation of the Superpixels in step S902, but in the present embodiment, the adjacency graph is generated based on the initial arrangement of the representative points that are initialized in step S901. The method of generating the adjacency graph is as is illustrated in the first embodiment. Also, the adjacency graph generated in step S903 is not limited to an adjacency graph that is based on the initial arrangement of the representative points; it may be a neighborhood graph as in FIG. 3D of the first embodiment.

Next, in step S904, the CPU 1002 unifies Superpixels based on the generated adjacency graph. Next, in step S905, the CPU 1002 performs discrimination processing on the unified Superpixels, and thereby discriminates categories. In this way, in the present embodiment, it is possible to realize optimization because it is possible to significantly omit processing for generating the adjacency graph or the neighborhood graph.

FIG. 8B is a flowchart for a case in which the processing of the second embodiment is executed by software. This processing is realized by the CPU 1002 reading a program stored in the HDD 1005 into the RAM 1004, and executing it. Also, the processing illustrated in FIG. 8B adds a True edge determination (step S910) between step S903 and step S904 in relation to the processing illustrated in FIG. 8A. For this reason, details of processing other than the True edge determination of step S910 is omitted.

When the processing from step S901-step S903 completes, the CPU 1002, in step S910, reads a label map, and determines True edges, which are edges that represent correct adjacency relationships from out of the edges generated in step S903. Next, in step S904, the CPU 1002 unifies Superpixels based on the result of the determination. In FIG. 8B, processing for determining True edges is necessary, but because processing for generating an adjacency list without overlapping edges representing the adjacency relationship as was done conventionally can be omitted, it is possible to optimize over what is conventional. Also, for the determination in step S910, configuration may be taken to determine False edges in place of True edges, and in such a case, True edges are detected by subtracting the False edges in step S903.

As explained above, by virtue of the present embodiment, it is possible to realize by software the same effect as in the first and second embodiments.

Fourth Embodiment

In the first and second embodiments explanation was given for examples in which Superpixel unification is performed using a neighborhood or adjacency graph that represents a neighborhood or adjacency relationship using the initial arrangement of the representative points. However, limitation is not made to performance based on the initial arrangement of the representative points.

Figure 9A:
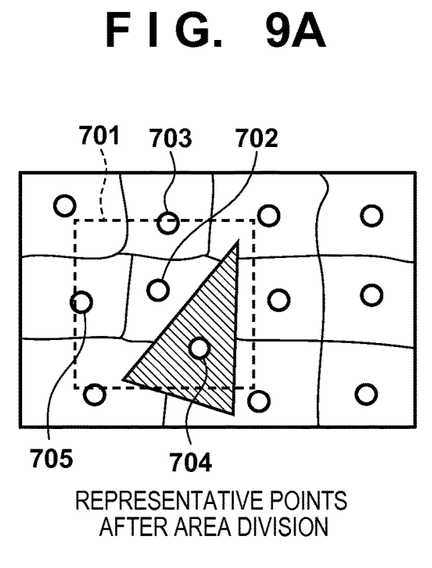
FIGS. 9A and 9B are views for explaining generation of an adjacency graph for representative points in a fourth embodiment.
Figure 9B:
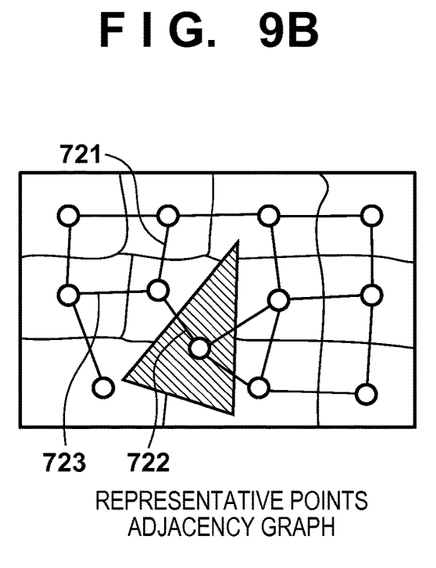

For example, it is possible to generate a graph based on information of the coordinate space of the representative points generated by the Superpixel generating unit 102. FIG. 9A is a view for illustrating a layout of representative points after segmentation by the Superpixel generating unit 102. In order to generate the graph based on the information of the coordinate space of the representative points, edges are generated by extracting representative points that exist within a predetermined range of a representative point of interest. For example, representative points 703, 704 and 705 that exist in a rectangular range 701 indicating a predetermined range from a representative point 702 are extracted. Then, as is illustrated in FIG. 9B, edges 721, 722 and 723 which connect the extracted representative points 703, 704 and 705 and the representative point 702 are generated. FIG. 9B is an adjacency graph of representative points obtained by performing this processing for all of the representative points. Note for this adjacency graph, as explained in the second embodiment, a correct Superpixel adjacency relationship is not represented, and therefore True edges may be detected and used similarly to in the second embodiment for the adjacency graph of FIG. 9B.

Also, in the first through third embodiments, explanation was given based on the SLIC method of document 1, but limitation is not made to this. For example, it is possible to achieve the same effect as in the first through third embodiments with a segmentation method that defines representative points and clusters pixels.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-204213, filed Oct. 2, 2014, which is hereby incorporated by reference herein in its entirety.

What is claimed is:

1. An image processing apparatus comprising:
one or more processors; and
one or more memories coupled to the one or more processors and having instructions stored thereon which, when executed by the one or more processors, cause the image processing apparatus to:
arrange representative points on an inputted image;
divide the inputted image into a plurality of areas by clustering a plurality of pixels in the inputted image based on the arranged representative points, wherein the representative points are updated based on feature amounts of the respective divided areas and the inputted image are further divided into updated areas by clustering the pixels in the inputted image based on the updated representative points;
generate a graph connecting arranged representative points based on initial arrangement of the arranged representative points, wherein the connected representative points in the graph have an adjacency relationship; and
unify the updated areas based on respective feature amounts of the updated areas and the generated graph.

2. The apparatus according to claim 1, wherein the instructions, when executed by the one or more processors, further cause the apparatus to determine whether or not the updated areas corresponding to the respective representative points connected by the generated graph are adjacent.

3. The apparatus according to claim 2, wherein the instructions, when executed by the one or more processors, further cause the apparatus to determine whether or not the updated areas corresponding to the respective representative points connected by the graph are adjacent based on a change of an area in which respective pixels belong.

4. The apparatus according to claim 1, wherein the instructions, when executed by the one or more processors, further cause the apparatus to discriminate a category of an area after the unification based on a feature amount of the area after the unification.

5. The apparatus according to claim 1, wherein each of the arranged representative points is a fixed representative point.

6. The apparatus according to claim 1, wherein the arranged representative points comprise color space and coordinate space information, and
wherein the instructions, when executed by the one or more processors, further cause the apparatus to generate the graph based on the information of the coordinate space of the arranged representative points.

7. The apparatus according to claim 1, wherein the instructions, when executed by the one or more processors, further cause the apparatus to extract a representative point existing in a predetermined range of a representative point of interest from the representative points, and generate a graph of the extracted representative point and the representative point of interest.

8. The apparatus according to claim 1, wherein the instructions, when executed by the one or more processors, further cause the apparatus to calculate, for two representative points included in the graph, a similarity of a feature amount of two updated areas corresponding to the respective representative points included in the graph, and unify the two updated areas if the similarity is high.

9. A method of controlling an image processing apparatus, comprising:
arranging representative points on an inputted image;
dividing the inputted image into a plurality of areas by clustering a plurality of pixels in the inputted image based on the arranged representative points, wherein the dividing updates the representative points based on feature amounts of the respective divided areas and further divides the inputted image into updated areas by clustering the pixels in the inputted image based on the updated representative points;
generating a graph connecting arranged representative points based on initial arrangement of the arranged representative points, wherein the connected representative points in the graph have an adjacency relationship; and
unifying the updated areas based on respective feature amounts of the updated areas and the generated graph.

10. A non-transitory computer-readable storage medium storing a program for causing a computer to execute steps of a method of controlling an image processing apparatus, the method comprising:
arranging representative points on an inputted image;
dividing the inputted image into a plurality of areas by clustering a plurality of pixels in the inputted image based on the arranged representative points, wherein the dividing updates the representative points based on feature amounts of the respective divided areas and further divides the inputted image into updated areas by clustering the pixels in the inputted image based on the updated representative points;
generating a graph connecting arranged representative points based on initial arrangement of the arranged representative points, wherein the connected representative points in the graph have an adjacency relationship; and
unifying the updated areas based on respective feature amounts of the updated areas and the generated graph.

* * * * *